(12) United States Patent
Lipsett et al.

(10) Patent No.: US 6,611,964 B2
(45) Date of Patent: Sep. 2, 2003

(54) SELECTIVE PANTS AND BANDS FOR CUSTOMIZED ASSEMBLY

(75) Inventors: Barry Lipsett, Medford, MA (US); Stina Shaw, Wayland, MA (US)

(73) Assignee: Charles River Apparel, Inc., Medford, MA (US)

( * ) Notice: Subject to any disclaimer, the term of this patent is extended or adjusted under 35 U.S.C. 154(b) by 0 days.

(21) Appl. No.: 10/125,841

(22) Filed: Apr. 19, 2002

(65) Prior Publication Data

US 2002/0116748 A1 Aug. 29, 2002

Related U.S. Application Data

(60) Provisional application No. 60/294,903, filed on May 31, 2001.

(51) Int. Cl.[7] .................................................. A41D 1/06
(52) U.S. Cl. ................................................... 2/227; 2/69
(58) Field of Search ............................ 2/227, 228, 238, 2/114, 69, 79, 80, 83, 244, 246, DIG. 1, 269, 270, 96, 243.1; D2/738, 739, 741, 742

(56) References Cited

U.S. PATENT DOCUMENTS

| | | | | | |
|---|---|---|---|---|---|
| 2,391,535 A | * | 12/1945 | Zelano | ............. | 2/DIG. 1 |
| 3,230,545 A | * | 1/1966 | Galley | ............. | 2/74 |
| 3,761,962 A | * | 10/1973 | Myers | ............. | 2/79 |
| 4,494,248 A | * | 1/1985 | Holder | ............. | 2/69 |
| 4,683,595 A | * | 8/1987 | Cash | ............. | 2/105 |
| 5,282,277 A | * | 2/1994 | Onozawa | ............. | 2/69 |
| 6,161,223 A | * | 12/2000 | Andrews | ............. | 2/234 |
| D465,900 S | * | 11/2002 | Tanaka | ............. | D2/742 |
| D469,946 S | * | 2/2003 | Hansen et al | ............. | D2/742 |

FOREIGN PATENT DOCUMENTS

GB        219259 A   *   1/1988 ..................... 2/69

\* cited by examiner

*Primary Examiner*—Gloria M Hale
(74) *Attorney, Agent, or Firm*—Morse, Altman & Martin

(57) ABSTRACT

A product and process involving pants having customized bands or stripes at their sides. The pants include gaps extending down the sides of the legs. A decorative band fits within the gap and is attached by continuous fasteners, such as zippers and/or discrete fasteners, such as snaps. The process comprises acquiring a relatively small inventory of pants of different sizes, acquiring a relatively large inventory of decorative bands of different colors and/or designs, and receiving and fulfilling orders for the customized pants by inserting and attaching the bands within the gaps as needed to fulfill orders.

17 Claims, 7 Drawing Sheets

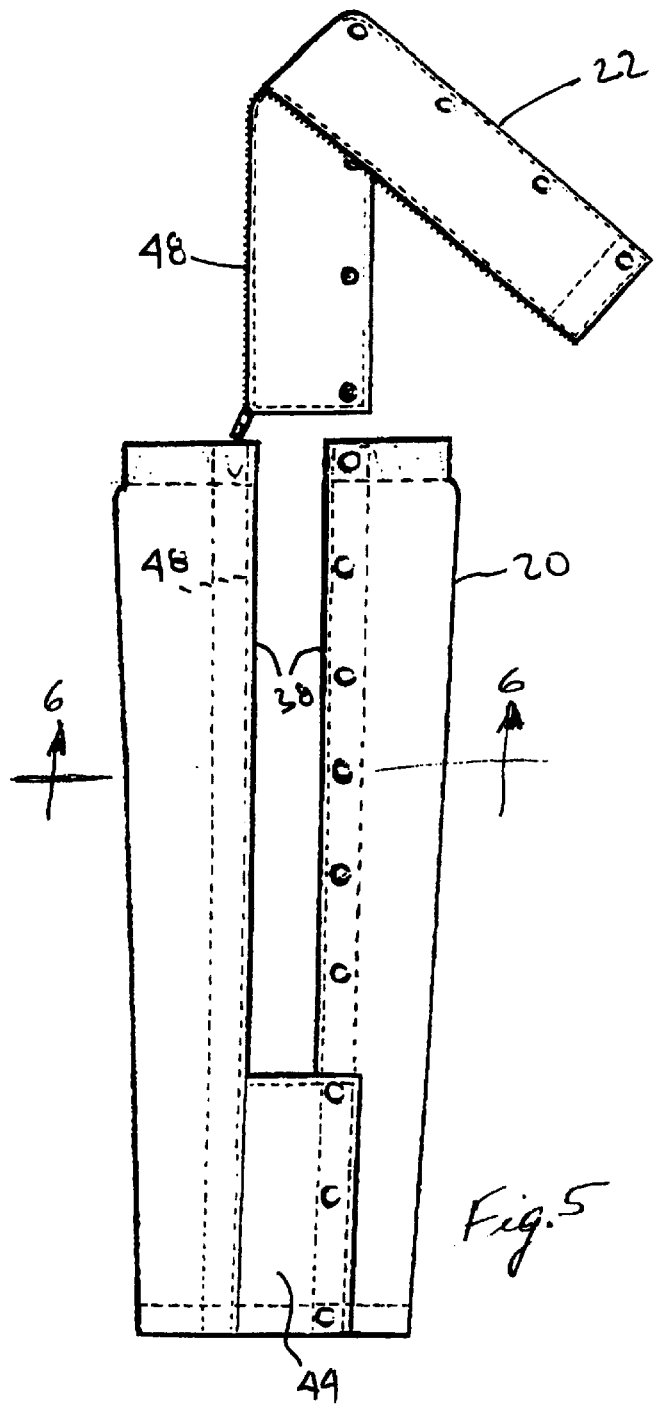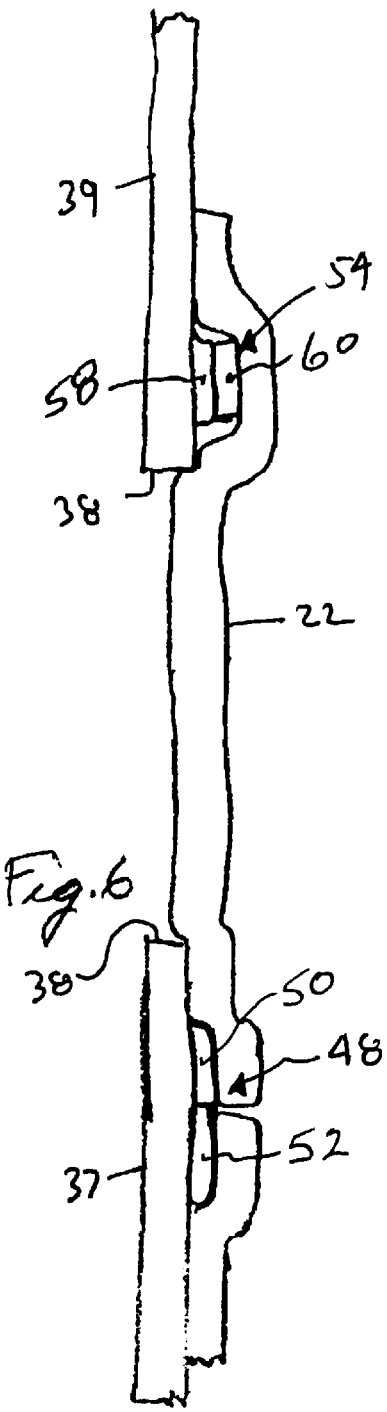

SELECTIVE PANTS AND BANDS FOR CUSTOMIZED ASSEMBLY

CROSS-REFERENCES TO RELATED APPLICATIONS

The applicant wishes to claim the benefit of U.S. Provisional Patent Application No. 60/294,903, dated May 31, 2001 for SELECTIVE PANTS AND STRIPES FOR CUSTOMIZED ASSEMBLY in the names of Barry Lipsett and Stina Shaw.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to trimmed pants of the type that are adorned with vertical side stripes, bands or the like. Such pants are intended to provide a visual flourish that is appropriate for sports, parades, and similar events.

2. Description of the Related Art

Such trimmed pants often are provided with vertical decorative side stripes, bands or the like, which are chosen by individuals or organizations as a matter of personal preference or as an emblem of group identity. In view of the many different colors and designs that often are ordered for immediate delivery, sales organizations that carry such trimmed pants have had to maintain unduly large and costly inventories in order to accommodate a diversity of customers.

BRIEF SUMMARY OF THE INVENTION

The primary object of the present invention is to provide, for convenient assembly as customized trimmed pants: (1) a body construction having a configuration that is designed to be slipped over the legs, trunk, and waist, and (2) a pair of vertical decorative band constructions having distinguishable color and design for ready affixation to the opposed flanks of the pants, i.e. the waist, trunk, calf, and ankle. To enable such assembly, each body construction, which accounts for the major component of unit cost, is completely fabricated except for the decorative bands. Available for attachment to the flanks of the body construction are any of a great variety of band constructions of different colors and designs, each of which individually accounts for a minor component of unit cost. As a practical matter, such an inventory includes a relatively small number of body constructions in a range of sizes and a relatively large number of band constructions in a variety of colors and designs. By virtue of the foregoing assembly system, keeping an economical inventory is feasible.

It is desired that the pants resulting from the assembly of each body construction and band construction appear to be a unitary original manufacture. Because of the acute sensitivity of the human eye to even a minor misalignment or discontinuity, the present invention provides the following interconnections pursuant to the present invention. At the forward and rearward vertical edges of the band construction, and at the corresponding forward and rearward vertical edges of a gap in the body construction are mating fasteners. Preferably, these band construction edges and body construction edges are provided with border regions that conceal the mating fasteners. In one form, these border regions are in the form of flaps. The flaps mask the fasteners and any visual discontinuities at the edges of the bands. Furthermore, since the mating fasteners are precisely located on the band and body constructions and positively lock them in proper position, misalignment is precluded during assembly.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 5 is an exploded, side view of the pants design of FIGS. 1 and 2;

FIG. 6 is a cross-sectional, magnified view of the pants design of FIG. 5 taken along line 6—6;

DETAILED DESCRIPTION OF THE INVENTION

1. The Embodiment of FIGS. 1 through 6

Figure 3:
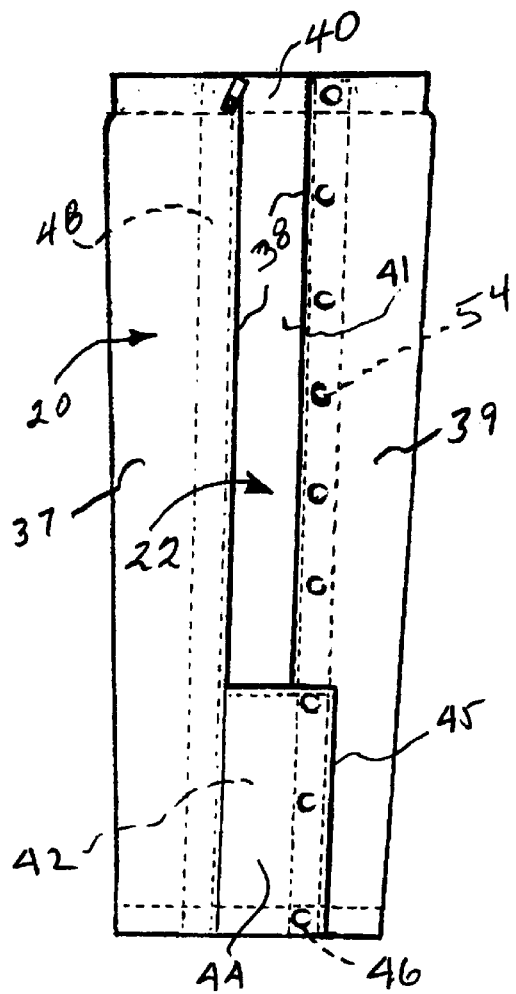
FIG. 3 is a side view of the pants design of FIGS. 1 and 2.
Figure 4:
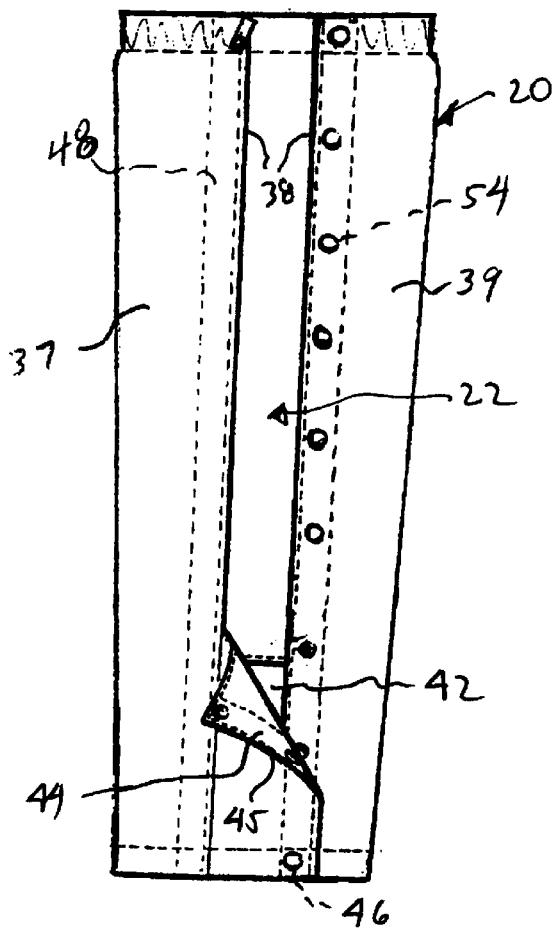
FIG. 4 is a partially assembled, side view of the pants design of FIGS. 1 and 2.

FIGS. 1 through 6 illustrate a preferred embodiment of the present invention as comprising, as best shown in FIG. 3, a body construction 20 and a band construction 22. As now will be explained, the band construction 22 blends with the body construction 20 to provide a smoothly integrated appearance.

Figures 1, 2:
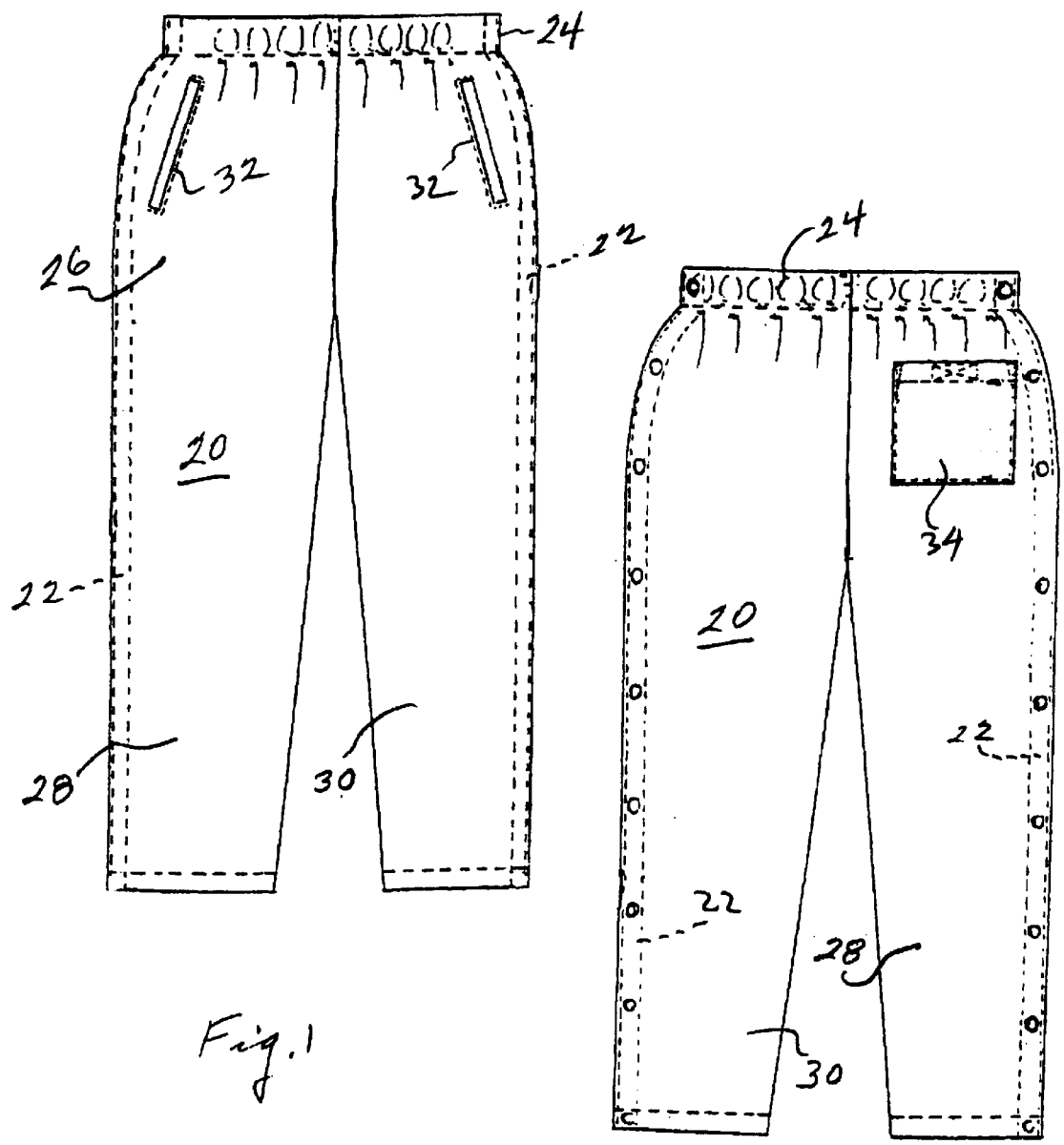
FIG. 1 is a front view of one embodiment of a pants design of the present invention.
FIG. 2 is a rear view of the pants design of FIG. 1.

The body construction 20 comprises a waist 24, a trunk 26, and a pair of legs 28 and 30. As seen in FIGS. 1 and 2, respectively, the trunk 26 is optionally provided with a pair of front slant pockets 32 at the hips and a patch pocket 34 at the rear. Optionally, waist 24 is elasticized to provide stretch. Preferably, the pants shell fabric is composed of a taffeta-type fabric such as 210T taffeta nylon.

As shown in FIG. 3, the opposed flanks of the body construction 20 are bifurcated to provide opposed elongated gaps, one being shown at 38, between the front section 37 and the rear section 39 of the pants construction 20. Gap 38 extends downwardly from the waist, as at 40, via the trunk, as at 41, to a lower extremity in the vicinity of the calf or ankle of the leg, as at 42. Bridging gap 38 is the band construction 22. In the illustrated embodiment of FIGS. 1 through 6, the lower end of each band construction 22 is concealed by a flange 44 which extends laterally and rearward from the front section 37 of the leg across gap 38, and overlies the rear section 39 of the leg. The free edge 45 of the flange 44 overlies and attaches to the rear section 39 by a series of discrete fasteners 46, such as snaps or buttons.

The opposed edges of band construction 22 are held in position in gap 38 by a pair of opposed fasteners. As shown, one edge of band construction 22 is held by a continuous fastener 48, such as a zipper or microhook/microloop fastener, in a position underlying the matched edge of gap 38. The mating components of continuous fastener 48 are shown at 50 and 52 in FIG. 6. The other edge of band construction 22 is held in position in gap 38 by a series of discrete fasteners 54, such as snaps or buttons, in a position underlying the matched edge of gap 38. The mating male and female components of discrete fasteners 54 are illustrated at 58 and 60 in FIG. 6.

2. The Embodiment of FIGS. 7 and 8

Figure 7:
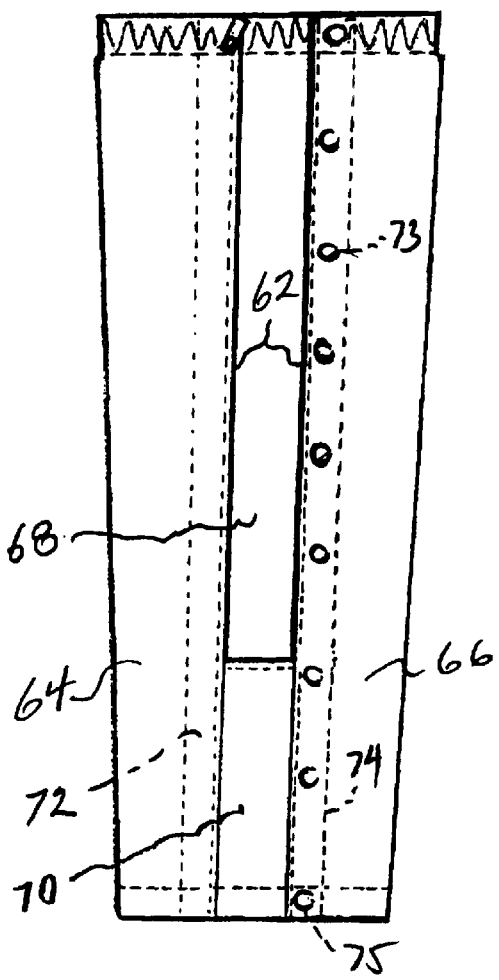
FIG. 7 is a side view of a second embodiment of a pants design of the present invention.
Figure 8:
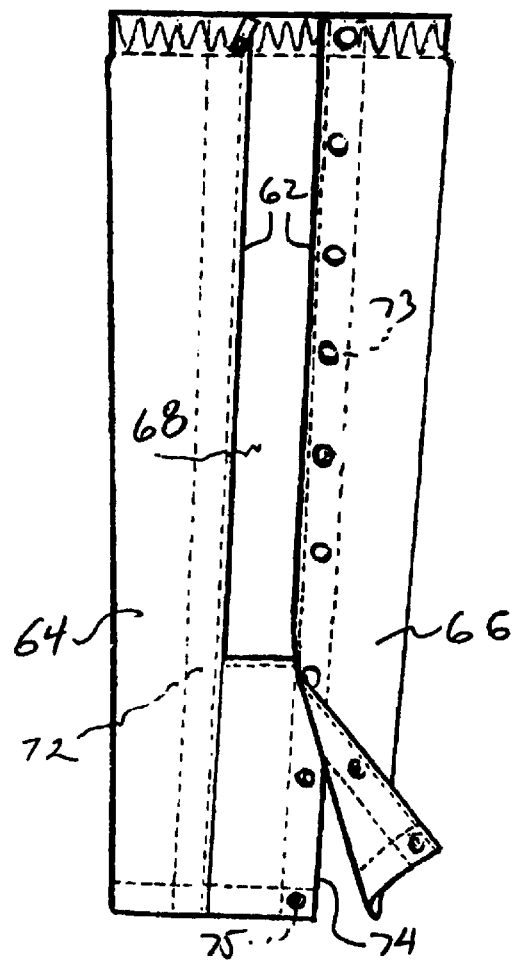
FIG. 8 is a partially assembled, side view of the pants design of FIG. 7.

In the embodiment of FIGS. 7 and 8, the front and rear sections 64 and 66, respectively, of the leg are separated by a gap 62. Bridging gap 62 is a band construction 68. One edge of band construction 68 is held by a continuous fastener 72, such as a zipper or microhook/microloop fastener, in a position underlying the matched edge of gap 62. The other edge of band construction 68 is held by a series of discrete fasteners 73, such as snaps or buttons, in a position underlying the matched edge of gap 62. At the bottom of the leg is a flange 70, which extends laterally and rearward from front leg section 64. The free edge 74 of flange 70 underlies and attaches to the rear section 66 by a series of discrete fasteners 75, such as snaps or buttons.

3. The Embodiment of FIGS. 9 through 11

Figure 9:
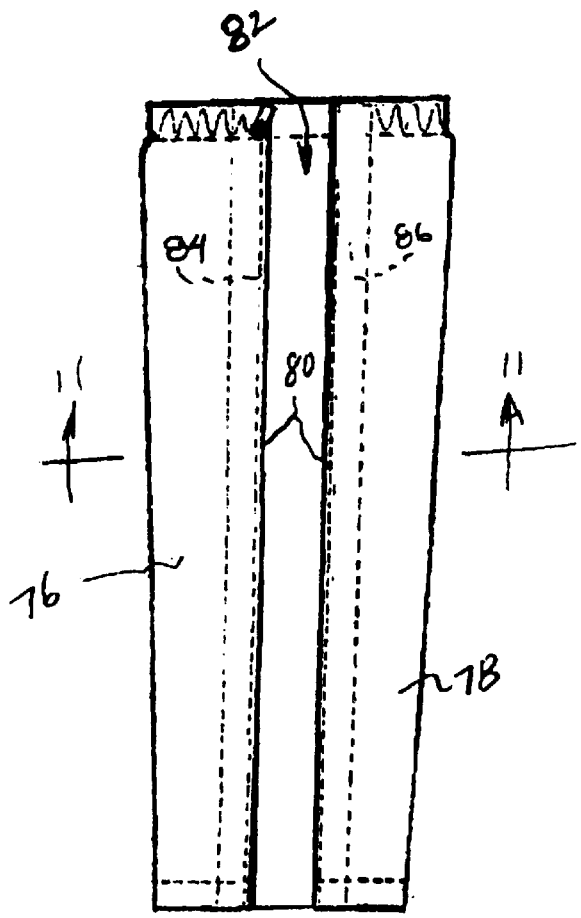
FIG. 9 is a side view of a third embodiment of a pants design of the present invention.
Figure 10:
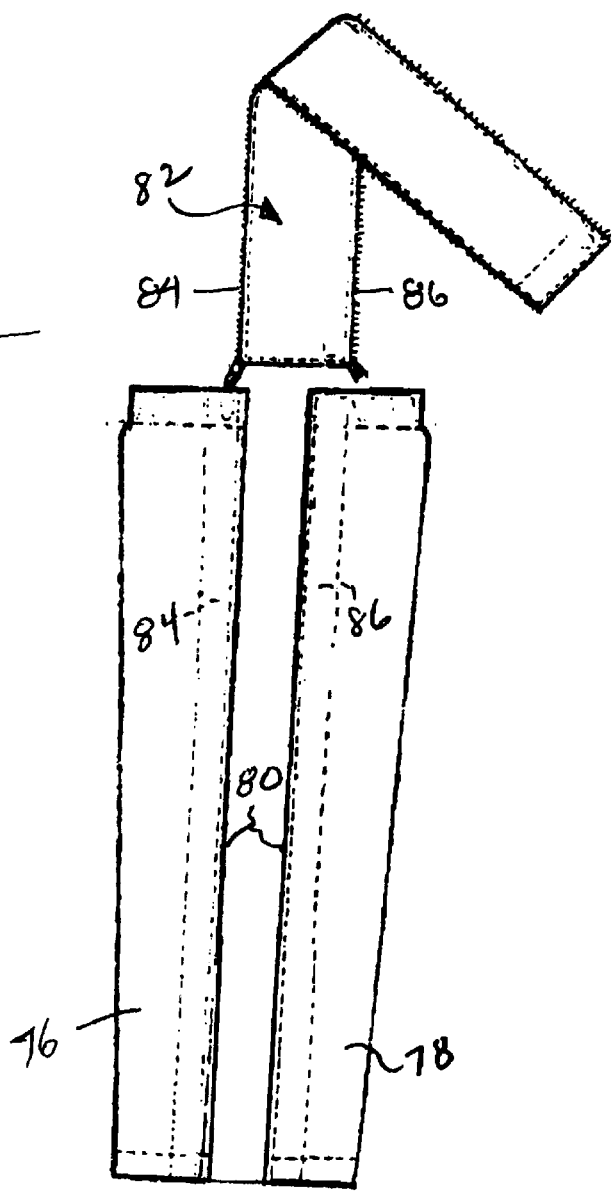
FIG. 10 is a partially assembled, side view of the pants design of FIG. 9.
Figure 11:
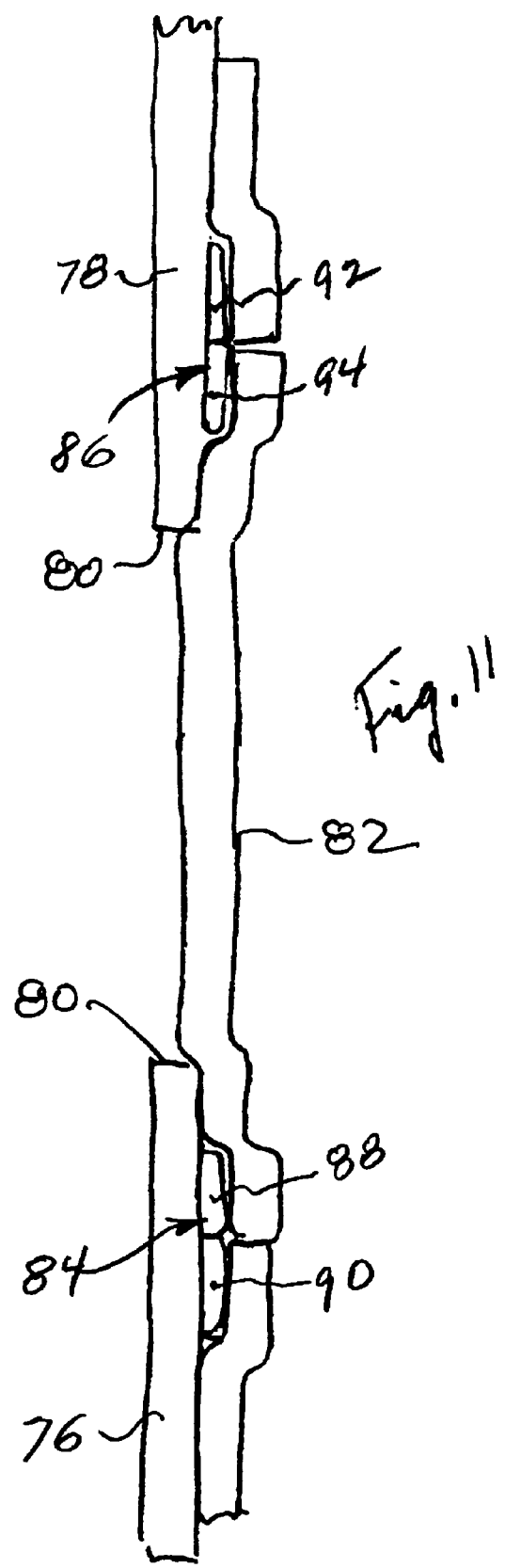
FIG. 11 is a cross-sectional, magnified view of the pants design of FIG. 9 taken along line 11—11.

In the illustrated embodiment of FIGS. 9, 10, and 11, the front and rear sections 76 and 78, respectively, of the leg are separated by a gap 80. Bridging gap 80 is a band construction 82. One edge of band construction 82 is held by a continuous fastener 84, such as a zipper or microhook/microloop fastener, in a position underlying the matched edge of gap 80. The other edge of band construction 82 is held by another continuous fastener 86 in a position underlying the matched edge of gap 80. The elongated components of continuous fastener 84 are shown in FIG. 11 at 88 and 90. The elongated components of continuous fastener 86 are shown in FIG. 11 at 92 and 94.

Figure 12:
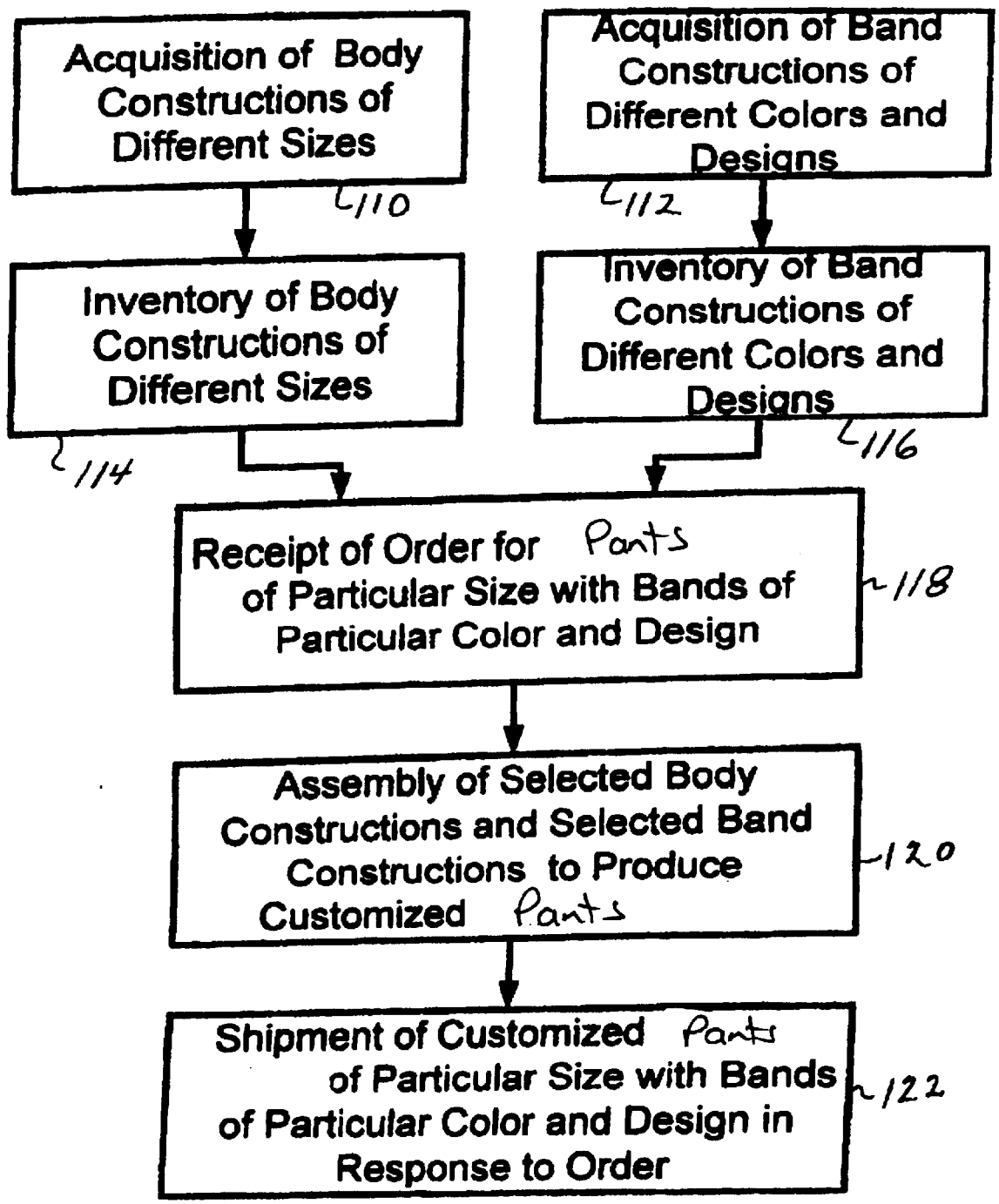
FIG. 12 is a block diagram of the inventory process of the present invention.

4. The System and Process of FIG. 12

The present invention contemplates the acquisition, as at 110 and 112, by a distributor or retailer, of inventories of body constructions of different sizes, as at 114, and inventories of band constructions of different colors and designs, as at 116. For example, the body constructions cover the following selections of sizes: Small/Medium, Large/X-Large, and XX-Large/XXX-Large. The selections of the lengths, i.e., the vertical dimensions, of the bands are commensurate with the selections of the body construction sizes. Preferably the bands range in width, i.e., in horizontal dimension, from 2 to 6 inches. Thus, the continuous fasteners for larger sizes are longer than the continuous fasteners for smaller sizes. When an order is received, as at 118, the seller assembles the customized pants unit or units, as at 120, and ships or otherwise delivers them, as at 122, to the customer.

Operation

Each customized unit comprises (1) body construction having a textile configuration that facilitates slipping over the legs, trunk, and waist, and (2) a band construction having distinguishable color and design for affixation to the body construction. The inventory of body constructions, which accounts for the major component of unit cost, is completely fabricated except for the decorative band or bands. Available for attachment to the body construction are any of a great variety of bands of different colors and designs, each of which individually accounts for a minor component of unit cost. By virtue of the foregoing assembly arrangement, an economical inventory arrangement is feasible.

Thus it has been shown and described pants and a process which satisfy the objects set forth above.

Since certain changes may be made in the present disclosure without departing from the scope of the present invention, it is intended that all matter described in the foregoing specification and shown in the accompanying drawings be interpreted as illustrative and not in a limiting sense.

We claim:

1. A pants design comprising:
   (a) a body construction including a waist, a trunk, and a pair of legs;
   (b) opposed flanks of said body construction providing a pair of opposed gaps extending substantially from said waist and along said trunk and said legs, said gaps having edges;
   (c) a pair of opposed decorative band constructions having distinguishable color and design, said band constructions having edges;
   (d) said pair of opposed band constructions being registered with said pair of opposed gaps; and
   (e) pairs of opposed mating fasteners for joining said edges of said pairs of band constructions to said edges of said pairs of gaps.

2. The pants design of claim 1 wherein at least one of each of said pairs of fasteners is a continuous fastener.

3. The pants design of claim 2 wherein said continuous fastener is a zipper.

4. The pants design of claim 1 wherein at least one of each of said pairs of fasteners is a series of discrete fasteners.

5. The pants design of claim 4 wherein said series of discrete fasteners is a series of snaps.

6. A pants design comprising:
   (a) a body construction including a waist, a trunk, and a pair of legs;
   (b) opposed flanks of said body construction providing a pair of opposed gaps extending substantially from said waist and along said trunk and said legs to lower extremities, said gaps having edges;
   (c) a pair of opposed decorative band constructions having distinguishable color and design, said band constructions having edges;
   (d) said pair of opposed band constructions being registered with said pair of opposed gaps;
   (e) pairs of distributions of opposed mating fasteners for joining the edges of said pairs of band constructions to said edges of said pairs of gaps; and
   (f) flanges extending across said gaps at said lower extremities to positively join forward and rearward regions on opposite sides of said gaps.

7. The pants design of claim 6 wherein at least one of each of said pairs of fasteners is a continuous fastener.

8. The pants design of claim 7 wherein said continuous fastener is a zipper.

9. The pants design of claim 6 wherein at least one of each of said pairs of fasteners is a series of discrete fasteners.

10. The pants design of claim 9 wherein said series of discrete fasteners is a series of snaps.

11. The pants design of claim 6 wherein each of said flanges extends from a forward region and overlies a rearward region, and is attached to said rearward region by a series of discrete fasteners.

12. The pants design of claim 6 wherein each of said flanges extends from a forward region and underlies a rearward region, and is attached to said rearward region by a series of discrete fasteners.

13. An inventory method comprising the steps of:
(a) acquiring an inventory of body constructions of different sizes, each of said body constructions including a waist, a trunk and a pair of legs, opposed flanks of each of said body constructions providing a pair of opposed gaps extending substantially from said waist and along said trunk and said legs, said gaps having edges;
(b) acquiring an inventory of band constructions of different colors and designs, said band constructions having edges;
(c) receiving orders from customers for customized combinations of selections of said body constructions and selections of said band constructions;
(d) assembling said selections of said body constructions and said selections of said band constructions to provide customized pants pursuant to said orders wherein said band constructions are registered with said gaps and said band constructions are attached to said body constructions by connecting mating pairs of fasteners on said gap edges and said band construction edges; and
(e) shipping said customized pants to said customers.

14. The inventory method of claim 13 wherein at least one of said pairs of fasteners is a continuous fastener.

15. The inventory method of claim 14 wherein said continuous fastener is a zipper.

16. The inventory method of claim 13 wherein at least one of said pairs of fasteners is a series of discrete fasteners.

17. The inventory method of claim 16 wherein said series of discrete fasteners is a series of snaps.

* * * * *